United States Patent Office 3,432,488
Patented Mar. 11, 1969

3,432,488
SOLUBLE SILYLATED CELLULOSE AND METHOD OF PREPARING SAME
Herman L. Finkbeiner and Johann F. Klebe, Schenectady, N.Y., assignors to General Electric Company, a corporation of Delaware
No Drawing. Filed Sept. 9, 1966, Ser. No. 578,160
U.S. Cl. 260—212                                   8 Claims
Int. Cl. C08b *15/00;* D06m *1/00;* C07f *7/02*

ABSTRACT OF THE DISCLOSURE

Cellulose is reacted with a triorganosilylhydrocarbonamide or a triorganodisilazane employing as a solvent, an alkyl pyrrolidone or a hexaalkylphosphoramide to produce silylated cellulose. These silylated celluloses are useful in producing films for packaging, protection, insulation and the like.

---

This invention relates to a method of preparing novel silicon-containing derivatives of cellulose and to the compositions produced thereby. More particularly, this invention relates to a new class of materials, soluble silylated celluloses and to a method of preparing same.

Heretofore, it has been known to silylate cellulosic materials employing as a silylating agent an alkylchlorosilane such as trimethylchlorosilane, triethylchlorosilane, dimethyldichlorosilane and methyltrichlorosilane, etc. However, this method had among its deficiencies the fact that it produced only silylated celluloses which were insoluble in the solvents usually employed to dissolve cellulosic esters and ethers, e.g., benzene, toluene, chloroform, ethylene dichloride, etc.

We have now discovered a novel method of producing silylated celluloses which does not require the use of chlorosilanes as a silylating agent, thereby expanding the particular cellulosic-type materials which can be silylated since the harmful hydrogen chloride is not produced, and therefore, does not render the cellulose itself liable to attack from the hydrogen chloride. In addition, our process produces organosilylated celluloses which are soluble in a number of solvents as contrasted to the insoluble organosilylated celluloses produced by other methods, for example, in the manner described in United States Patent 2,562,955, issued Aug. 7, 1951.

In accordance with our invention, silylated celluloses are produced by forming an admixture of cellulose, a member of the group consisting of N-alkylpyrrolidone and hexaalkylphosphoramide, and a silylating agent selected from the class consisting of organosilylhydrocarbonamides of the formula (I)

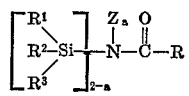

and organodisilazanes of the formula (II)

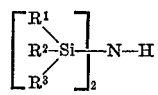

and mixtures of the amides or disilazanes, where R is a monovalent hydrocarbon radical or halogenated monovalent hydrocarbon radical, $R^1$ is a member of the class consisting of hydrogen, alkyl groups, haloalkyl groups and cyanoalkyl groups, $R^2$ and $R^3$ are members of the class consisting of monovalent hydrocarbon radicals, halogenated monovalent hydrocarbon radicals, and cyanoalkyl groups, Z is a hydrogen or a monovalent hydrocarbon radical, R, $R^1$, $R^2$ and $R^3$ being free of reactive hydrogens as determined by the Zerewitinoff method and $a$ is an integer of 0 or 1 and maintaining said admixture under anhydrous conditions at a temperature at which said cellulose and said silylating agent react to produce said silylated cellulose.

The cellulosic materials employed in the process of this invention may be cellulose itself as derived from cotton or wood pulps such as sulfate, sulfite, or soda pulp from which the pentosan, resin, lignin and like constituents have been removed, and organic ethers and esters of cellulose having free hydroxyl groups such as the incompletely substituted alkyl, aralkyl, hydroxylalkyl and carboxyalkyl esters or ethers of cellulose.

The ratio of reactants is not critical and will depend upon the amount of silylation one wishes to obtain in conducting the process of this invention. Thus, for example, if one wishes to have essentially complete silylation of all the hydroxyl groups of the cellulose, one would employ from 1.0 to 2.0 equivalents of the hydrocarbonamide of Formula I or the disilazane of Formula II for each hydroxyl group in the cellulose. Where less than all of the hydroxyl groups are desired to be silylated, one employs correspondingly lesser amounts of the amide of FormulaI or the disilazane of Formula II.

The temperature at which the process of this invention is conducted can range from about 15° C. to 150° C., or even higher. For ease of operation and convenience, it is preferred to conduct the process of this invention at the reflux temperature of the reaction mixture.

The amount of the N-alkylpyrrolidone or hexaalkylphosphoramide employed in the process of this invention is also not critical and can range from 10 to 1000 parts, by weight, of the pyrrolidone or phosphoramide per 100 parts, by weight, of the cellulose. Preferably, one employs from 50 to 800 parts, by weight, of the pyrrolidone or the phosphoramide per 100 parts, by weight, of the cellulose.

The organosilylhydrocarbonamides which can be employed in the process of this invention are, for example, bis(trimethylsilyl)acetamide, bis(dimethylphenylsilyl) acetamide, bis(methyl-di-γ-cyanopropylsilyl)benzamide, N-trimethylsilylacetamide, N-(tripropylsilyl)propionamide, N-(dimethylhydrogensilyl)butyramide, etc. Many other examples of these organosilylhydrocarbonamides can be found in copending application Ser. No. 398,781, assigned to the same assignee as the present invention.

The organodisilazanes which can be employed in the process of this invention are, for example, hexamethyldisilazane, hexaethyldisilazane, sym(tetramethyldiphenyl)disilazane, hexa(γ-cyanopropyl)disilazane,

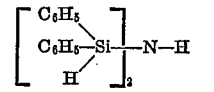

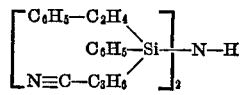

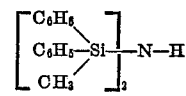

etc.

The N-alkylpyrrolidones which can be employed in the process of this invention are, for example, N-methylpyrrolidone, N-ethylpyrrolidone, N-butylpyrrolidone, N-isopropylpyrrolidone, etc.

The hexaalkylphosphoramides which can be employed in the process of this invention are, for example, hexamethylphosphoramide, hexaethylphosphoramide, hexapentylphosphoramide, hexaoctylphosphoramide, etc.

In addition to the above-mentioned pyrrolidones or phosphoramides which one employs in the process of this invention, one can also employ solvents such as benzene, toluene, xylene, carbon tetrachloride, chloroform, methylene chloride, hexane, heptane, octane, etc., in admixture with the pyrrolidone or the phosphoramide.

The monovalent hydrocarbon radicals included by R, $R^2$, $R^3$ and Z are, for example, alkyl groups, aryl groups, alkaryl groups and aralkyl groups. The alkyl (including cycloalkyl) radicals may be, for example, methyl, ethyl, propyl, butyl, pentyl, hexyl, octyl, octadecyl, cyclobutyl, cyclopentyl, cyclohexyl, cycloheptyl, etc.; the aryl radicals are, for example, phenyl, naphthyl, etc.; alkaryl groups are, for example, tolyl, xylyl, ethylphenyl, etc.; aralkyl groups are, for example, benzyl, phenylethyl, phenylbutyl, etc. The halogenated monovalent hydrocarbon radicals included by R, $R^2$ and $R^3$ are, for example, chloropropyl, trifluoropropyl, trifluoromethyl, chlorobutyl, fluorocyclohexyl, fluorophenyl, fluoronaphthyl, trifluoromethylphenyl, chlorobenzyl, chlorophenylethyl, etc. The cyanoalkyl groups included by $R^1$, $R^2$ and $R^3$ are, for example, cyanoethyl, cyanopropyl, cyanobutyl, etc. The alkyl, haloalkyl, and cyanoalkyl groups included by $R^1$ are those set forth above in the representations for R, $R^2$ and $R^3$.

The reaction which takes place in the process of this invention is the reaction between the hydrogen of the hydroxyl group of the cellulose and the silylamide of Formula I or disilazane of Formula II and is shown in the following general equation which for simplicity shows the reaction of one hydroxyl of an anhydroglucose unit of cellulose with N-trimethylsilylacetamide.

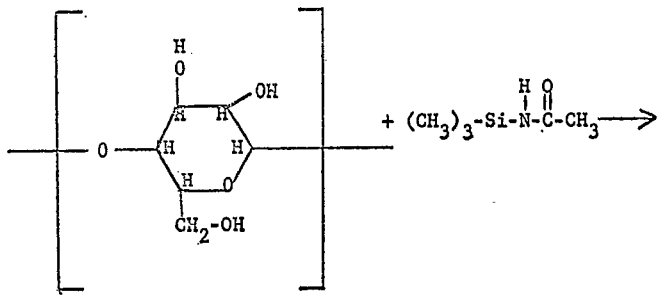

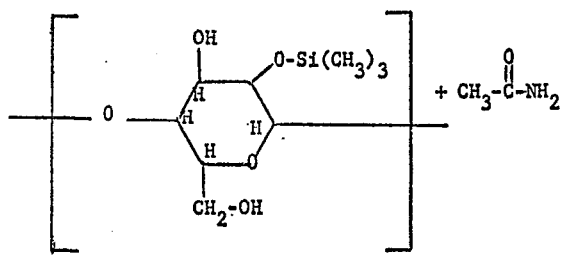

The novel organosilylated celluloses having an average of from 2 to 3 organosilyl units per anhydroglucose units which are produced in accordance with the process of this invention include the organosilyl-containing celluloses which are silylated with units having the formula

wherein R' is a member of the class consisting of hydrogen, alkyl groups, haloalkyl groups and cyanoalkyl groups, R" is a member of the group consisting of aryl groups, alkaryl groups, cyanoalkyl groups, haloaryl groups and haloalkaryl groups, and R''' is a member of the class consisting of monovalent hydrocarbon radicals, halogenated monovalent hydrocarbon radicals and cyanoalkyl groups. The monovalent hydrocarbon radicals, halogenated monovalent hydrocarbon radicals, and cyanoalkyl groups that are represented by R''' are those given above for $R^2$ and $R^3$. The alkyl groups, haloalkyl groups and cyanoalkyl groups represented by R' are, for example, those set forth above for $R^1$. R" represents aryl groups such as phenyl, naphthyl, etc.; alkaryl groups such as tolyl, xylyl, etc.; cyanoalkyl groups such as cyanopropyl, cyanoethyl and cyanobutyl, etc.; haloaryl groups such as chlorophenyl, chloronaphthyl, etc. and haloalkaryl groups such as chlorotolyl, chloroxylyl, chloroethylphenyl, etc.

The novel organosilylated celluloses of this invention are those wherein from 67% to 100% of the anhydroglucose units have the average formula

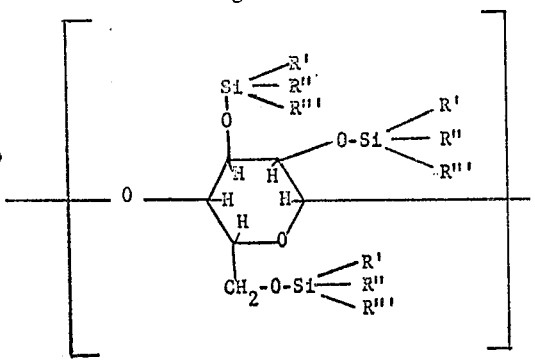

wherein R', R" and R''' are as above defined.

We have found that the novel organosilylated celluloses set forth above are soluble in many common organic solvents thereby giving them much greater utility than the silylated celluloses known heretofore in the art. By way of example, solutions of these novel organosilylated celluloses having units of Formula IV can be used to cast films for packaging, protection, insulation and the like. Fibers may be spun by conventional techniques known to those in the art from these solutions providing a unique set of properties combining those of cellulose and those of siloxanes. In addition, these soluble organosilylated celluloses can be used as varnishes, paints and protective coatings.

The solvents in which the novel organsilylated celluloses having units of Formula IV are soluble depend, as those skilled in the art realize, upon the particular substituents in the silyl group which is attached to the cellulose. For example, when such substituents are all of the hydrocarbon type or halohydrocarbon type, solvents such as the halogenated aliphatic and aromatic hydrocarbons, e.g., chloroform, carbon tetrachloride, methylene chloride, chlorobenzene, dichlorobenzene, etc. and the aliphatic and aromatic hydrocarbon solvents such as cyclohexane, n-hexane, heptane, cycloheptane, octane, benzene, toluene, xylene, etc., are preferred to be employed as the solvent. When a highly polar group such as a cyanoalkyl group is attached to the silicon, then polar solvents such as acetonitrile, chloroform, pyridine, and the like can be employed as the solvent.

We have found that the process of our invention is particularly adaptable to the preparation of trimethylsilylated celluloses having an average substitution of from 2 to 3 trimethylsilyl units per anhydroglucose unit in the cellulose, which are soluble in organic solvents. The organic solvents in which the trimethylsilylated cellulose having 2 to 3 trimethylsilyl units per anhydrous glucose units are soluble, are the halogenated aliphatic and aromatic hydrocarbons, for example, chloroform, carbon tetrachloride, methylene chloride, chlorobenzene, dichlorobenzene, etc., and the aliphatic and aromatic hydrocarbon solvents such as cyclohexane, n-hexane, heptane, cycloheptane, octane, benzene, toluene, xylene, etc.

The organosilylated celluloses of this invention find utility as paper release agents and the like. Thus, for example, the paper can be treated with a solvent solution of the silylated cellulose and the solvent removed by slight heating to yield a paper coated with silylated cellulose. This paper is now hydrophobic and in addition has good release properties when employed, for example, in applications such as spouts for milk cartons.

The following examples serve to further illustrate this invention. All parts are parts by weight unless otherwise expressly set forth.

EXAMPLE 1

A mixture of 5 grams of pure white cellulose flock and 35 grams of bis(trimethylsilyl)acetamide and 40 grams of hexamethylphosphoramide was heated with stirring for 1 hour at 140° C. There resulted a highly viscous mass to which was added 200 cc. of xylene and the stirring continued at 140° C. for an additional 4 hours. A viscous solution was obtained which was diluted with 200 cc. of benzene and filtered through a pressure filter. The polymer was precipitated by addition of this solution to methanol to yield 9.1 grams of a colorless polymer which is 79% of theoretical based on complete silylation.

The polymer obtained was easily soluble in chlorinated solvents such as chloroform and carbon tetrachloride, and in aliphatic and aromatic solvents such as cyclohexane and benzene. Analysis of this silylated material showed that it contained 20% silicon which indicates that the average substitution was 2.6 silyl groups per anhydroglucose unit. The polymer had an intrinsic viscosity of 2.17 deciliters per gram in benzene at 25° C.; a chloroform solution of the polymer had an infrared spectrum which absorbed at 1090–1050 cm.$^{-1}$, a band associated in solution spectra with the Si—O—C system. A film which was cast by slow evaporation of the solvent from a 5% solution of the polymer in benzene had a tensile strength of 3833 p.s.i. and an elongation at break of 26%.

EXAMPLE 2

A mixture of 80 grams of cellulose flock, 800 grams of hexamethyldisilazane and 800 grams of N-methylpyrrolidone was heated with stirring at the reflux temperature of the mixture. A small amount of a low boiling liquid (probably hexamethyldisiloxane formed from water in the sample) was distilled off; the remaining mixture reaching a temperature of 145° C. The mixture was maintained at 145° C. for an additional two hours at which time the cellulose had dissolved and the mixture became very viscous. Xylene (800 grams) was added and the stirring continued at 145° C. for another three hours until the evolution of ammonia had ceased. The solution thus obtained was filtered and the polymer precipitated by adding methanol to the solution. There was obtained 55 grams of trimethylsilylated cellulose.

EXAMPLE 3

A mixture of 5 grams of ethyl cellulose having an average of from 0.7 to 0.8 hydroxyl groups per anhydroglucose unit, 5 grams of bis(trimethylsilyl)acetamide, 5 grams of N-methylpyrrolidone and 50 cc. of benzene was stirred in an anhydrous atmosphere in a flask heated at 85° to 90° C. for one hour. The clear, colorless solution thus obtained was poured into methanol with stirring, to precipitate a colorless, fibrous product which weighed about 5.2 grams after drying overnight at 80° C. at 20 mm. Hg pressure. The colorless, fibrous product is soluble in aliphatic hydrocarbon and insoluble in alcohols, in contrast to the starting ethyl cellulose. It is also soluble in chlorinated hydrocarbon and in aromatic hydrocarbon solvents. An analysis of the material showed that it contained 55.39% carbon, 9.10% hydrogen and 6.3% silicon. The data corresponds to an average of 2.25 ethoxy groups, 0.65 trimethylsilyloxy units and 0.1 hydroxy units per repeating anhydroglucose unit. A film cast from a 5% solution of the polymer in benzene showed a tensile strength of 5660 lbs. per square inch and an elongation at break of 10%. The intrinsic viscosity in chloroform at 25° C. was 1.9 dcl./gm.

EXAMPLE 4

A mixture of 12.5 grams of wood cellulose, 55 grams of N - [dimethyl(γ-cyanopropyl)silyl] - N-methylacetamide and 250 grams of N-methylpyrrolidone was stirred under a nitrogen atmosphere in a bath heated at 150°–160° C. After about 30 minutes, all the solid wood cellulose had gone into solution. The stirring and heating at 150° C. was continued for a total of 2 hours resulting in a clear, viscous solution. Toluene (200 cc.) was added and the solution dropped slowly into methanol with stirring. A white, fibrous precipitate was obtained which was identified as dimethyl(γ-cyanopropyl)silyl cellulose. The dimethyl(γ-cyanopropyl)silyl cellulose polymer was thoroughly washed with methanol and dried at 100° C. and 200 mm. Hg pressure for approximately 18 hours. 36 grams of the polymer was obtained which is an 87% of the theory based on complete silylation. The silylated polymer is soluble in chloroform, pyridine, acetonitrile and other polar solvents. Analysis of the polymer gave the following: Carbon, 53.45%; H, 7.94%; N, 7.48%; Si, 14.78%, which corresponds to 88% silylation, or 2.64% dimethyl(γ-cyanopropyl)silyl units per anhydroglucose unit in the cellulose.

The N - [dimethyl(γ-cyanopropyl)silyl] - N-methylacetamide employed as a silylating agent in this example was prepared as follows: To N-methylacetamide (73 grams, 1 mole), triethylamine (120 grams) and toluene (200 cc.) was slowly added dimethyl(γ-cyanopropyl) chlorosilane (155 grams). The temperature was maintained below about 50° C. by controlling the rate of addition. The stirring at room temperature was continued for 1 hour after the addition was completed. The reaction mixture was filtered to remove the precipitated triethylamine hydrochloride, and was distilled through a spinning band column to yield N-[dimethyl(γ-cyanopropyl)-silyl]-N-methylacetamide (B.P. 90–93° C. at 0.03 mm. Hg). This material analyzed as follows:

Found: Carbon, 54.6%; hydrogen, 9.4%; nitrogen, 14.0%. Calculated: Carbon, 54.5%; hydrogen, 9.1%; nitrogen, 14.1%.

EXAMPLE 5

A mixture of 3.2 grams of wood pulp cellulose, 20 grams of N-(diphenylmethylsilyl)acetamide and 50 grams of N-methylpyrrolidone was heated under nitrogen with stirring at a temperature of from 160–170° C. After about 75 minutes, a clear, very viscous solution was obtained. The heating was continued for another 45 minutes and then cooled and diluted with benzene (200 cc.). The solution which contained no solids was poured slowly into methanol with stirring. The silylated polymer precipitated as a white fiber. The fiber was dried for about 16 hours at 150° C. and 20 mm. mercury yielding 10 grams of material which is 78% theory based on complete silylation and contains an average of 2.5 silyl groups per repeating anhydroglucose unit. The polymer was soluble in chlorinated aliphatic and aromatic solvents, and had an intrinsic viscosity in chloroform at 25° C. of 3.55 dcl./gm.

The N-(diphenylmethylsilyl)acetamide used in this example was prepared as follows: Diphenylmethylchlorosilane (232 grams) was slowly added to a stirred mixture of acetamide (60 grams), triethylamine (120 grams) and benzene (450 grams). The reaction temperature rose slightly and triethylamine hydrochloride precipitated. The stirred mixture was heated at reflux for about 1 hour after the addition was complete and then allowed to cool to about 55° C. and filtered. The filtrate was washed with several portions of benzene. N-(diphenylmethylsilyl)acetamide was recovered as a white crystalline material.

EXAMPLE 6

Thirty four grams of wood pulp cellulose which had been dried overnight at 100° C. and 20 mm. Hg pressure was added with stirring to a mixture of N,N-bis(trimethylsilyl)acetamide (82 grams) and N-methylpyrrolidone (300 grams) and heated to 150°–160° C. for one hour. Xylene (400 cc.) was then added and heating and stirring continued for 2 hours at which time another 400 cc. of xylene was added and the mixture heated at 150° C. for an additional 2 hours. Benzene (1 liter) was added yielding a solution which was completely free of solids. The solution was added with stirring to methanol to yield the polymer as a precipitate in the form of white threads. After washing the polymer with methanol until free of solvent, the polymer was dried at 50° C. and 20 mm. Hg pressure. There was obtained 67 grams of trimethylsilylated cellulose which is a 91% yield based on completely silylation. This cellulose contained an average of 2.73 trimethylsilyl group per anhydroglucose unit.

EXAMPLE 7

This example illustrates the silylation of cotton fabric in a manner whereby the cotton fabric is not weakened by the production of any hydrogen halide during the process.

Apiece of cotton fabric was immersed for 1 hour in a 1 to 1 weight mixture of N-methylpyrrolidone and N,N-bis(trimethylsilyl)acetamide which was heated at 140° C. The treated cotton fabric was then washed with alcohol and dried. The appearance and feel of the cotton fabric was unchanged, but the material was now highly water-repellent. Analysis of the material showed it to contain 1.6% silicon which corresponds to the reaction of 7% of the hydroxyl groups with the bis(trimethylsilyl)acetamide. The water-repellency of the material was undiminished after 48 hours in refluxing benzene and methylene chloride. The water-repellency was retained even after 5 washings with conventional detergents in an automatic washer.

EXAMPLE 8

Wood pulp cellulose can be added with stirring to a mixture of N,N-bis(dimethylhydrogensilyl)acetamide and hexamethylphosphoramide and heated to 100°–160° C. for 1 hour according to the procedure of Example 6. The reaction product can then be dissolved in toluene and recovered as in Example 6, to yield a cellulose which contains dimethylhydrogensilyl units in the anhydroglucose units.

It will, of course, be apparent to those skilled in the art that in addition to the ingredients given in the examples, other organosilylamides and silazanes within the scope of Formulas I and II, many examples of which have been given above, may be employed without departing from the scope of the invention. The conditions whereby the silylation is carried out may also be varied as is indicated previously by the disclosures and examples.

What we claim as new and desire to secure by Letters Patent of the United States is:

1. A process for producing an organosilylated cellulose which comprises forming an admixture of a cellulosic material with a silylating agent selected from the class consisting of organosilylamides of the formula

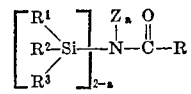

and silazanes of the formula

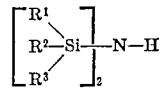

and mixtures of such amides and silazanes wherein R is a monovalent hydrocarbon radical or halogenated monovalent hydrocarbon radical, $R^1$ is a member of the class consisting of hydrogen, alkyl groups, haloalkyl groups, and cyanoalkyl groups, $R^2$ and $R^3$ are members of the class consisting of monovalent hydrocarbon radicals, halogenated monovalent hydrocarbon radicals and cyanoalkyl groups, Z is hydrogen or a monovalent hydrocarbon radical, and $a$ is 0 or 1, and a solvent selected from the group consisting of N-alkylpyrrolidone, and hexamethylphosphoramide, and maintaining said admixture at a temperature at which said cellulose and said silylating agent react to produce said organosilyalted cellulose.

2. A process as claimed in claim 1 which also employs an aromatic solvent selected from the class consisting of benzene, toluene, and xylene.

3. A process as claimed in claim 1 wherein the silylating agent is N,N-bis(trimethylsilyl)acetamide.

4. A process as claimed in claim 1 wherein the silylating agent is N-(diphenylmethylsilyl)acetamide.

5. A process as claimed in claim 1 wherein the silylating agent is N-[dimethyl(γ-cyanopropyl)silyl]-N-methylacetamide.

6. A soluble organosilylated cellulose having an average of from 2 to 3 organosilyl units per anhydroglucose unit produced in accordance with the process of claim 1.

7. A process for rendering cotton fabric water-repellent which comprises treating said cotton fabric with an organosilylhydrocarbonamide having the formula

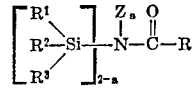

wherein R is a monovalent hydrocarbon radical or halogenated monovalent hydrocarbon radical, $R^1$ is a member of the class consisting of hydrogen, alkyl groups, haloalkyl groups and cyanoalkyl groups, $R^2$ and $R^3$ are members of the class consisting of monovalent hydrocarbon radicals, halogenated monovalent hydrocarbon radicals and cyanoalkyl groups, Z is hydrogen or a monovalent hydrocarbon radical, and $a$ is 0 or 1, while maintaining the temperature at from 15° C. to 200° C.

8. A process as claimed in claim 7, wherein said organosilyl hydrocarbonamide is N-trimethylsilylacetamide.

(References on following page)

References Cited

UNITED STATES PATENTS

| | | | |
|---|---|---|---|
| 3,318,659 | 5/1967 | Bullock et al. | 8—116 XR |
| 3,122,581 | 2/1964 | Pike | 8—116 XR |
| 2,562,955 | 8/1951 | Schuyten | 260—212 |

DONALD E. CZAJA, *Primary Examiner.*

R. W. MULCAHY, *Assistant Examiner.*

U.S. Cl. X.R.

260—448.2; 8—116.2